(12) United States Patent
Saux et al.

(10) Patent No.: US 12,222,885 B2
(45) Date of Patent: Feb. 11, 2025

(54) METHOD FOR TRANSFERRING DATA BETWEEN A FIRST DIGITAL DOMAIN AND A SECOND DIGITAL DOMAIN, AND CORRESPONDING SYSTEM ON A CHIP

(71) Applicant: STMicroelectronics (Rousset) SAS, Rousset (FR)

(72) Inventors: Nicolas Saux, Aix-en-Provence (FR); Sebastien Metzger, Aix-en-Provence (FR); Herve Cassagnes, Salon-de-Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 45 days.

(21) Appl. No.: 18/133,214

(22) Filed: Apr. 11, 2023

(65) Prior Publication Data
US 2023/0325336 A1  Oct. 12, 2023

(30) Foreign Application Priority Data

Apr. 12, 2022 (FR) .................................... 2203375

(51) Int. Cl.
*G06F 13/40* (2006.01)
*G06F 1/10* (2006.01)
*G06F 1/24* (2006.01)

(52) U.S. Cl.
CPC .............. *G06F 13/405* (2013.01); *G06F 1/10* (2013.01); *G06F 1/24* (2013.01); *G06F 2213/0038* (2013.01)

(58) Field of Classification Search
CPC . G06F 13/405; G06F 1/10; G06F 1/24; G06F 2213/0038; G06F 13/1689; G06F 1/12; G06F 13/4243; G06F 15/177; G06F 15/163; G06F 15/7807
See application file for complete search history.

(56) References Cited

U.S. PATENT DOCUMENTS

| 6,115,763 A | * | 9/2000 | Douskey | ............... G06F 11/267 710/72 |
| 11,532,338 B1 | * | 12/2022 | Eliaz | ....................... G11C 7/222 |
| 2003/0081708 A1 | * | 5/2003 | Gelke | ....................... G06F 5/06 375/354 |

(Continued)

FOREIGN PATENT DOCUMENTS

EP  3907886 A2  11/2021

OTHER PUBLICATIONS

INPI Search Report and Written Opinion for priority application, FR 2203375, report dated Nov. 8, 2022, 13 pgs.

*Primary Examiner* — Faisal M Zaman
(74) *Attorney, Agent, or Firm* — Crowe & Dunlevy LLC (57) ABSTRACT

The system on a chip includes at least a first digital domain configured to be reinitialized by a first reinitialization signal, a second digital domain and an interface circuit. The interface circuit includes a starting register in the first digital domain, a destination register in the second digital domain and a synchronization circuit in the first digital domain. The interface circuit is configured to transfer data from the starting register to the destination register upon command of a control signal transmitted by the synchronization circuit. The starting register and the synchronization circuit are configured to not be reinitialized by the first reinitialization signal.

24 Claims, 2 Drawing Sheets

(56) References Cited

U.S. PATENT DOCUMENTS

| | | | |
|---|---|---|---|
| 2006/0271806 A1* | 11/2006 | Castano | G06F 1/12 |
| | | | 713/500 |
| 2014/0143581 A1* | 5/2014 | Garg | G06F 1/12 |
| | | | 713/400 |
| 2015/0249602 A1* | 9/2015 | Barner | H04L 45/586 |
| | | | 370/389 |
| 2016/0103689 A1* | 4/2016 | Sanghi | G06F 11/1471 |
| | | | 710/313 |
| 2018/0173665 A1* | 6/2018 | Mishra | G06F 13/364 |
| 2020/0193555 A1* | 6/2020 | Appu | G06F 9/45558 |
| 2021/0333852 A1* | 10/2021 | Oja | G06F 1/08 |
| 2023/0036130 A1* | 2/2023 | Ditty | H03M 13/09 |
| 2023/0325336 A1* | 10/2023 | Saux | G06F 1/12 |
| | | | 713/400 |

* cited by examiner

FIG.1

METHOD FOR TRANSFERRING DATA BETWEEN A FIRST DIGITAL DOMAIN AND A SECOND DIGITAL DOMAIN, AND CORRESPONDING SYSTEM ON A CHIP

PRIORITY CLAIM

This application claims the priority benefit of French Application for Patent No. 2203375, filed on Apr. 12, 2022, the content of which is hereby incorporated by reference in its entirety to the maximum extent allowable by law.

TECHNICAL FIELD

Embodiments and implementations relate to the transfers of data between distinct digital domains of a system on a chip (SOC), in particular digital domains having different power supply voltages and operating frequencies.

BACKGROUND

Conventionally, a system on a chip (SOC) includes distinct power domains, that is to say in particular digital domains powered and clocked by different voltage-frequency pairs, certain power domains can be powered intermittently while other power domains can be powered all the time.

The power domains powered intermittently are typically high-performance domains that can be activated and deactivated according to the use of the system on a chip. These high-performance domains consume energy because they are powered by relatively high frequencies in the system on a chip.

As for the domains powered all the time, they are typically economical in terms of energy and allow in particular to maintain critical data or critical functions when the system operates in a low-power mode. Consequently, the domains powered all the time are typically clocked at low frequencies.

However, critical information to be preserved in the domain powered all the time can be written by initiators of transactions at high frequency, for example coming from the high-performance domain.

On the one hand, the critical information must be received and recorded, typically in registers of the low-frequency domain, regardless of the frequency of transmission of the data with respect to the frequency of writing of the registers.

On the other hand, a reinitialization of the system on a chip can occur randomly with respect to the writing of the registers, typically during an actuation of an external and asynchronous reinitialization signal.

This external and asynchronous reinitialization can cause a metastability in the registers containing the critical information to be transferred, leading to a malfunction of the system on a chip, if the reinitialization occurs at the same time as the writing of the registers.

The metastability of a register, such as a conventional D flip-flop known per se, typically occurs when the data pins of the register flip during a transition of its clock signal or when the clock signal is interrupted, in which cases the output of the register remains between the low and high states for a certain time and converges towards an unknown state.

Thus, a metastability of the registers of the low-frequency domain, containing critical data, can be caused when the inputs of this register are reinitialized in an asynchronous manner with respect to the low-frequency clock. For example, the event of external reinitialization during a transfer of the data between the two domains can corrupt the critical content of the register.

Consequently, there is a need to avoid the corruption of critical data during a transfer between two power domains of a system on a chip.

SUMMARY

According to one aspect, a system on a chip is proposed including at least a first digital domain configured to be reinitialized by a first reinitialization signal, a second digital domain and an interface circuit including at least one transfer element in the first domain. The interface circuit is configured to transfer data from said at least one transfer element to the second domain. Said at least one transfer element is configured to not be reinitialized by the first reinitialization signal.

The transfer element of the interface circuit is, for example, a register containing data to be transferred, or a digital signal state to be transferred.

Given that the transfer element of the interface circuit is not affected by the first reinitialization signal, which is, for example, an asynchronous external reinitialization signal, the risk of engaging data corrupted because of a metastability resulting from an asynchronous reinitialization by the first reinitialization signal during the transfer is greatly limited. Indeed, this allows the interface circuit to react in a controlled manner to a reinitialization by the first reinitialization signal, the transfer element thus being capable of terminating a transfer with uncorrupted data, despite a reinitialization occurring at the time of the transfer.

According to one implementation, the second domain is configured to be reinitialized by a second reinitialization signal, said at least one transfer element being configured to be reinitialized by the second reinitialization signal.

For example, the second reinitialization signal can be an internal signal for power-on reset used during a total stoppage of the system on a chip or during an intermittent stoppage of the domain, which occur synchronously.

According to one implementation, the first domain is configured to be clocked by a first clock signal at a first frequency and the second domain is configured to be clocked by a second clock signal at a second frequency lower than the first frequency.

This corresponds to an example in which the first domain is intended for high-performance digital executions, while the second domain is intended to be maintained in activity to record, for example, critical data coming from the first domain.

According to one implementation, the first domain is configured to receive the first reinitialization signal from outside the system on a chip in a manner asynchronous with the first clock signal, and the second domain is configured to generate the second reinitialization signal during a synchronous process of power-on reset of the system on a chip.

According to one implementation, the interface circuit includes a starting register out of said at least one transfer element, a destination register in the second domain and a synchronization circuit in the first domain, the interface circuit being configured to transfer data from the starting register to the destination register upon command of a control signal transmitted by the synchronization circuit, wherein the synchronization circuit is configured to not be reinitialized by the first reinitialization signal.

This further allows to limit the risk of engaging corrupted data in the transfer. Indeed, here again the interface circuit can react in a controlled manner to a reinitialization by the first reinitialization signal, given that the synchronization circuit is thus capable of not engaging the command of a transfer with corrupted data because of a metastability of the starting register, caused by a reinitialization occurring at the time of the loading of the starting register.

According to one implementation, the first domain is configured to communicate the data to be transferred on an input of the starting register and to communicate the control signal to the synchronization circuit at least one cycle of the first clock signal after said data, and the starting register is configured to input the data to be transferred in a single cycle of the first clock signal and then preserve said data independently of said input.

This implementation allows on the one hand to guarantee that the data to be transferred, when it is preserved by the starting register, is not corrupted by a possible reinitialization occurring after said single cycle used to input the data. Moreover, this implementation allows on the other hand to guarantee to not transfer data corrupted by a reinitialization occurring during said single cycle used to input the data, given that in such a case, the control signal cannot be communicated to the synchronization circuit one cycle after said single cycle used to input the data, since the reinitialization occurs during this cycle.

In other words, this implementation allows to not undergo a corruption of the data occurring after the cycle used for the input of the data, and to not transfer corrupted data during the cycle used for the input.

According to one implementation, the interface circuit includes a signal adaptation element out of said at least one transfer element, configured to transfer, between the first domain and the second domain, a link establishment signal.

This allows here again to limit the risk of engaging said signal contributing to said transfer, corrupted because of a reinitialization during the transfer.

According to one implementation, said at least one signal adaptation element includes a second starting register configured to input the value of a link establishment conditioning signal in a single cycle of said first clock signal and then preserve said value.

This implementation allows here again to not undergo a corruption in said signal occurring after the cycle used for the input of this signal.

According to one implementation, a control logic circuit is configured to generate a transfer state signal during the first cycle of the first clock signal of the transfer of the data from the first domain to the second domain, the starting register(s) being configured to input said data or said link establishment conditioning signal upon command of the transfer state signal, so that said single cycle of the first clock signal is this first cycle.

According to one implementation, the control logic circuit is configured to provide the transfer state signal offset by at least one cycle of the first clock signal to the synchronization circuit triggering the transmission of said control signal.

According to another aspect, a method is proposed for transferring data between at least a first digital domain, and a second digital domain of a system on a chip, comprising a transfer of the data from at least one transfer element in the first domain to the second domain, wherein a first reinitialization signal causes a reinitialization of the first domain but does not cause a reinitialization of said at least one transfer element.

According to one implementation, a second reinitialization signal reinitializes the second domain, and said at least one transfer element.

According to one implementation, the first domain is clocked by a first clock signal at a first frequency and the second domain is clocked by a second clock signal at a second frequency lower than the first frequency.

According to one implementation, the first reinitialization signal comes from outside the system on a chip in a manner asynchronous with the clock signal of the first domain, and the second reinitialization signal is generated during a synchronous process of power-on reset of the system on a chip.

According to one implementation, said transfer comprises a transfer of data carried out from a starting register out of said at least one transfer element, to a destination register in the second domain, upon command of a control signal transmitted by a synchronization circuit of the first domain, the first reinitialization signal not causing a reinitialization of a synchronization circuit.

According to one implementation, the method comprises a communication of the data to be transferred on an input of the starting register and a communication of the control signal to the synchronization circuit at least one cycle of the first clock signal after said data, and wherein the transfer of the data comprises an input, by the starting register, of the data to be transferred in a single cycle of the first clock signal and a preservation of said data afterward, independently of said input.

According to one implementation, said transfer comprises a signal adaptation from a signal adaptation element out of said at least one transfer element, comprising a transfer of a link establishment signal between the first domain and the second domain.

According to one implementation, said at least one signal adaptation comprises an input, in a second starting register, of the value of a link establishment conditioning signal in a single cycle of said first clock signal and a preservation of said value afterward.

According to one implementation, the method comprises a generation of a transfer state signal during the first cycle of the first clock signal of the transfer of the data from the first domain to the second domain, said input in the starting register(s) being controlled by the transfer state signal, so that said single cycle of the first clock signal is this first cycle.

According to one implementation, the transfer state signal is provided offset by at least one cycle of the first clock signal to the synchronization circuit and triggering the transmission of said control signal.

BRIEF DESCRIPTION OF THE DRAWINGS

Other advantages and features of the invention will appear upon examination of the detailed description of implementations and embodiments, in no way limiting, and of the appended drawings in which.

DETAILED DESCRIPTION

Figure 1:
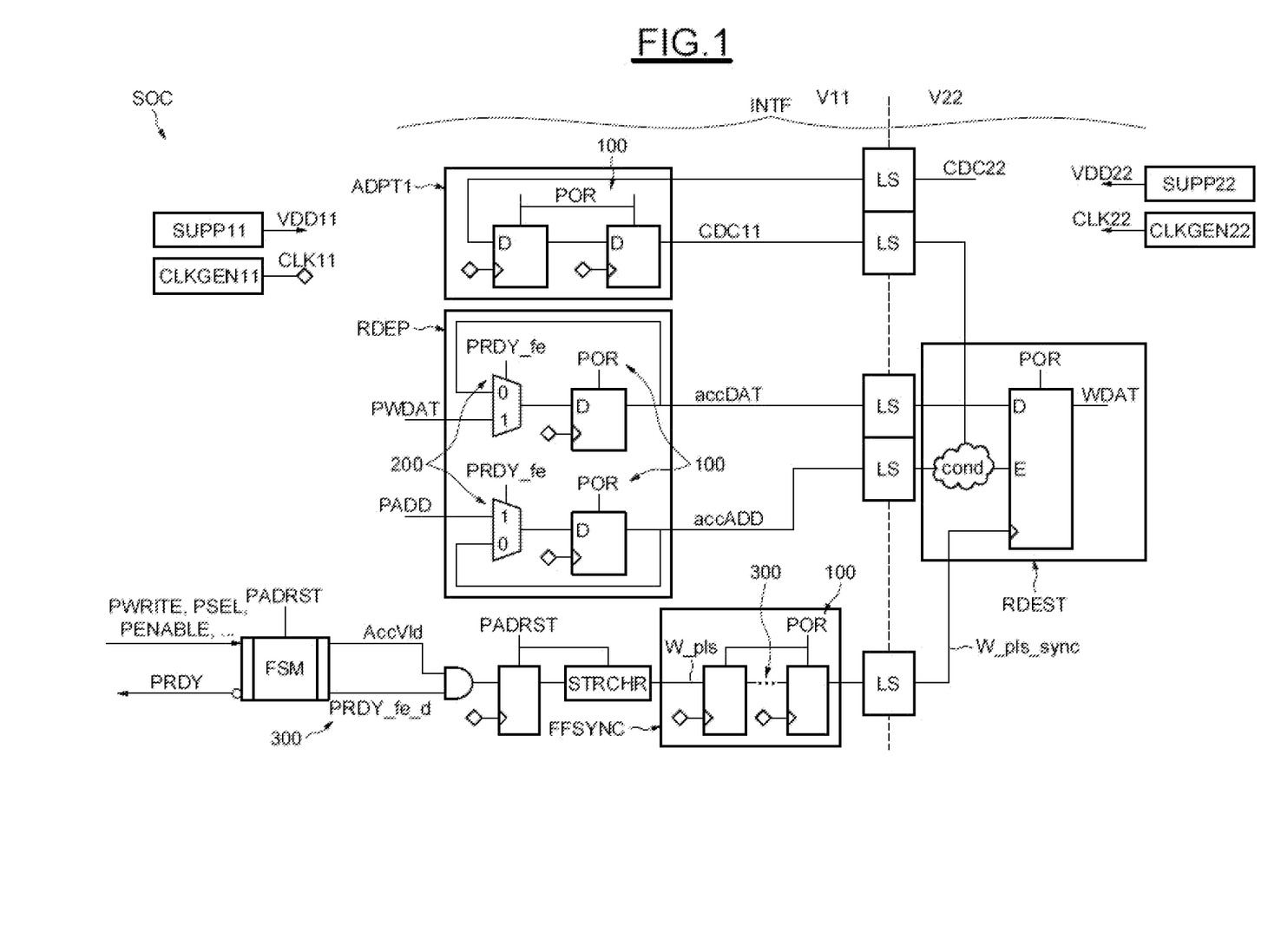
FIG. 1 illustrates a system on a chip (SOC) including two digital domains having different power supply voltages and different operating frequencies.

FIG. 1 illustrates an example of a system on a chip SOC including at least two digital domains V11, V22 having different power supply voltages and different operating frequencies.

The first digital domain V11 is powered by a first power supply voltage VDD11, for example of 1.1 volts, generated by a power supply stage SUPP11. The first digital domain V11 is clocked by a first clock signal CLK11 at a first frequency, generated by a clock generation stage CLK-GEN11.

The second digital domain V22 is powered by a second power supply voltage VDD22, for example of 3.3 volts, generated by a power supply stage SUPP22. The second digital domain V22 is clocked by a second clock signal CLK22 at a second frequency, generated by a clock generation stage CLKGEN22.

In this example, the second frequency is lower than the first frequency, and the second power supply voltage VDD22 is greater than the first power supply voltage VDD11.

In the context of this example, the first domain V11 can, for example, be configured to carry out operations with high performance and consequently a high energy consumption, while the second domain V22 can, for example, be configured to always be active, so as to ensure critical operations, and according to a low energy consumption.

Moreover, the first domain V11 is configured to be reinitialized by a first reinitialization signal PADRST, while the second domain V22 is configured to be reinitialized by a second reinitialization signal POR distinct from the first reinitialization signal PADRST. The respective reinitialization signals PADRST, POR are used to place the respective domain V11, V22 in a blank and controlled state (typically to restart the domain) and have the effect, in particular, of interrupting the actions in progress and of erasing the data contained in the registers of the reinitialized domain.

The first reinitialization signal PADRST can, in particular, be generated outside the system on a chip SOC in a manner asynchronous with the first clock signal CLK11. For example, the first reinitialization signal PADRST can be a forced reinitialization signal actuated by a user independently of the actions currently being executed by the first domain V11.

As for the second domain V22, it can be configured to generate the second reinitialization signal POR during a synchronous process of power-on reset of the system on a chip SOC.

Critical information to be preserved in the second domain V22 can be written by initiators coming from the first domain V11, and the system on a chip SOC includes in this respect an interface circuit INTF configured to implement a transfer of data and of signals between the two domains V11, V22.

The interface circuit INTF allows to make compatible, in particular according to the respective voltage-frequency pairs of each domain, the signals coming from the first domain V11 for transmission to the second domain V22, and optionally the signals coming from the second domain V22 for transmission to the first domain V11.

Moreover, the interface circuit INTF allows to protect the data, potentially critical, against a corruption caused by an asynchronous reinitialization occurring during the transfer.

Indeed, if an asynchronous reinitialization causes a flipping of the input signals of registers during a transition window of the clock signal clocking the registers (usually "setup-hold window"), then the outputs of the registers can find themselves in metastable states. In the metastable state, an output signal oscillates between the high state and the low state for a certain time then converges towards a state unknown and independent of the input signal.

From the point of view of the compatibility between the first power supply voltage VDD11 and the second power supply voltage VDD22, the interface circuit INTF includes circuits for offsetting voltage levels LS configured to convert the voltages of the logic levels of one of the two domains V11, V22 to the corresponding voltage of the other domain V22, V11.

From the point of view of the compatibility between the first frequency CLK11 and the second frequency CLK22, the interface circuit INTF includes, in particular, a starting register RDEP in the first domain V11, a synchronization circuit FFSYNC in the first domain V11, and a destination register RDEST in the second domain V11.

In this context, reference to "a circuit in the first domain (respectively second domain)" means that this circuit belongs to the first domain (respectively to the second domain), that it is powered by the first power supply voltage VDD11 (respectively the second power supply voltage VDD22) and that its operation is clocked by the first clock signal CLK11 (respectively the second clock signal CLK22).

The interface circuit INTF includes transfer elements RDEP, ADPT1, (see also FIG. 2 ADPT2, RDEP2) in the first domain V11, in order to transfer data PWDAT, PADD, or signals such as a link establishment signal CDC11, to the second domain V22.

Figure 2:
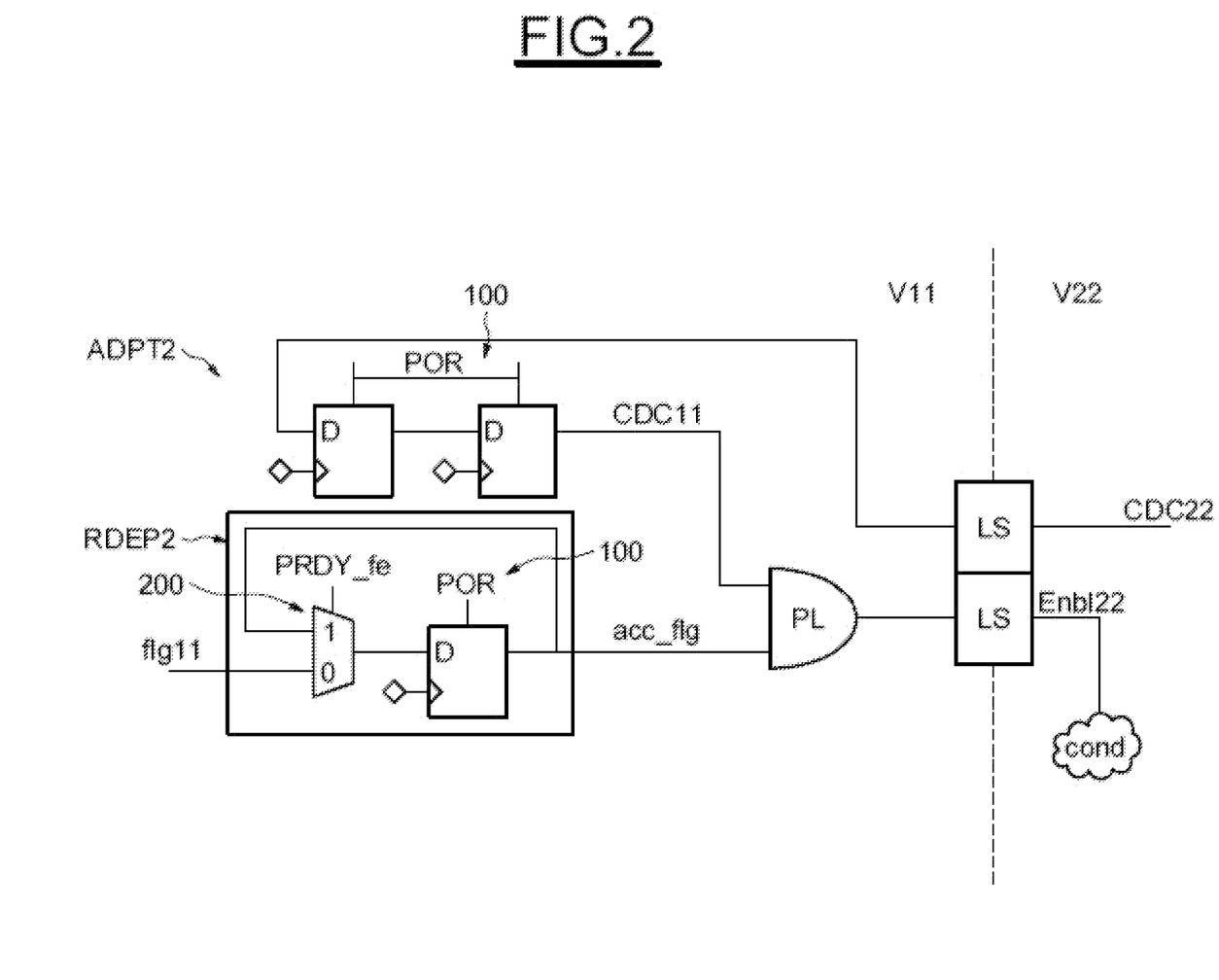
FIG. 2 illustrates a signal adaptation element.

In the examples of FIGS. 1 and 2, the transfer elements include registers, in particular starting registers RDEP, RDEP2, intended for transfers of data, and signal adaptation elements ADPT1, ADPT2, intended for transfers of functional signals, such as link establishment signals.

The transfer elements RDEP, ADPT1, ADPT2, RDEP2 are advantageously configured to not be reinitialized by the first reinitialization signal PADRST of the first domain V11.

To transfer data PWDAT, PADD, coming from the first domain V11 to the second domain V22, the interface circuit INTF is configured to load the data to be transferred PWDAT, PADD into the starting register RDEP, in a manner clocked by the first clock signal CLK11 in the first domain V11. The data accDAT, accADD loaded into the starting register RDEP is then transferred to the destination register RDEST upon command of a control signal W_pls_sync transmitted by the synchronization circuit FFSYNC configured to clock the destination register of the second domain V22.

For example, the data to be transferred is intended to be written in a memory of the second domain V22 and can include in this respect content data PWDAT and a respective memory address PADD. The data and addresses are transmitted by words of N bits (with N a natural number) for example 16 bits, 32 bits or 64 bits, on respective buses. The starting register RDEP consequently includes a register of respectively 16, 32 or 64 bits to contain the data word PWDAT to be transferred and a register of respectively 16, 32 or 64 bits to contain the corresponding address word PADD.

From the point of view of the protection against a corruption caused by an asynchronous reinitialization during the transfer, the interface circuit INTF is configured to implement measures 100, 200, 300 to ensure an absence of risk of corruption.

In the first measure 100, the transfer elements RDEP, ADPT1 and the synchronization circuit FFSYNC are configured to not be reinitialized by the first reinitialization signal PADRST, contrary to the other circuits of the first domain V11.

The transfer elements RDEP, ADPT1 and the synchronization circuit FFSYNC can nevertheless be configured to be reinitialized by the second reinitialization signal POR. This does not present a risk from the point of view of the corruption of data given that the second reinitialization signal POR is generated in a synchronous manner by the system on a chip SOC.

Thus, because of the first measure 100, if the first reinitialization signal PADRST occurs during the transfer of the data accDAT, accADD correctly loaded into the starting register RDEP, this data accDAT, accADD is not erased at the output of said starting register RDEP. In particular the data accDAT, accADD loaded into the starting register RDEP cannot flip during the transition window of the destination register RDEST. Likewise, because of the first measure 100, the control signal W_pls_sync transmitted to the destination register RDEST by the synchronization circuit FFSYNC cannot flip in an unexpected manner during an input of the data by the destination register RDEST, thus ensuring a correctly carried out input of said data accDAT, accADD in the second domain V22.

Moreover, the data to be transferred PWDAT, PADD is communicated by general use circuits (not shown) of the first domain V11, on input pathways of the starting register RDEP.

In the second measure 200, the starting register RDEP is configured to input the data to be transferred PWDAT, PADD in a single cycle of the first clock signal CLK11, and then preserve said data accDAT, accADD, for example in a D flip-flop, independently of the input pathways PWDAT, PADD.

The starting register RDEP can include in this respect a multiplexer element providing the data to be preserved in the starting register. The multiplexer element is configured in this respect to select either the data PWDAT, PADD present in the input pathways, or the data accDAT, accADD contained in the starting register RDEP, re-looped from the output of the starting register RDEP to an input of the multiplexer.

The multiplexer element is thus controlled to select (on "1") the input pathways PWDAT, PADD during a single cycle to input the data PWDAT, PADD in the starting register RDEP, then to select (on "0") the re-looping of the output of the starting register RDEP subsequently, in order to preserve the inputted data accDAT, accADD.

Advantageously in this respect, the multiplexer element can be controlled by a transfer state signal PRDY_fe, generated by a control logic circuit FSM, also called "state machine" or "finite-state machine". The transfer state signal PRDY_fe is generated during the first cycle of the first clock signal CLK11 of the transfer of the data.

The multiplexer element is thus controlled to select the input pathway PWDAT, PADD by the transfer state signal PRDY_fe. The starting register RDEP is thus configured to input said data PWDAT, PADD upon command of the transfer state signal PRDY_fe, so that said single cycle of the first clock signal CLK11 is the first cycle of the clock signal CLK11 of the implementation of the transfer.

This allows to guarantee that the data to be transferred accDAT, accADD cannot be corrupted on the input pathway PWDAT, PADD by a possible reinitialization PADRST occurring after the first cycle of the transfer, given that the data accDAT, accADD is preserved by the starting register RDEP independently of the state of the data signals on said input pathway PWDAT, PADD.

Alternatively to use of the multiplexer element, a clock locking circuit, usually designated by the terms "clock gating", can be provided on the clock signal clocking the D flip-flop of the starting register in order to input the data on the input pathways in a single cycle. A conventional clock locking circuit, advantageously glitch free, can be obtained by an assembly of a D flip-flop clocked by the inverted clock signal CLK11, and receiving as an input the transfer state signal PRDY_fe. A gate ET between the output of the D flip-flop and the clock signal CLK11 allows to transmit a clock pulse conditioned by the transfer state signal PRDY_fe.

In practice, and in an example according to a communication protocol of the Advanced Peripheral Bus (APB) type, the transfer state signal PRDY_fe can come from a signal PRDY provided in the APB protocol, and generated by the control logic circuit FSM. The signal PRDY provided in the APB protocol is generated at a first logic level, for example 0, during any implementation of the transfer, and at a second logic level, for example 1, outside of the implementation of the transfer. Consequently, a falling edge is produced on this signal PRDY at the beginning of the first cycle of the transfer.

On the basis of this falling edge, the transfer state signal PRDY_fe controlling the multiplexer element and as defined above can be generated, that is to say the generation of the time of capture of the data PWDAT, PADD during the first cycle of the transfer.

Moreover, on the basis of the signal PRDY provided in the APB protocol, the offset transfer state signal PRDY_fe_d can be generated, defining the time at which the writing in the second domain V22 is commanded, that is to say after and only after this first cycle, as defined below in relation to the third measure 300.

For example, and in a manner adapted to the context of the APB protocol, the control logic circuit FSM is also configured to receive control signals PWRITE, PSEL, PENABLE, coming from the first domain V11, controlling the transfer.

In the third measure 300, the synchronization circuit FFSYNC is configured to transmit the control signal W_pls_sync to the destination register RDEST after the first cycle of the clock signal CLK11 clocking the implementation of the transfer in the first domain V11. In this respect, the control logic circuit FSM is advantageously configured to provide the transfer state signal offset PRDY_fe_d by one (or more) cycles of the first clock signal CLK11, in order to trigger the generation and the transmission of the control signal W_pls_sync to the destination register RDEST by the synchronization circuit FFSYNC.

The control signal W_pls_sync is, for example, generated by a pulse-stretching circuit STRCHR, configured to generate a pulse W_pls having a duration sufficiently long to cross the circuit for offsetting voltage levels LS, on the basis of a pulse generated in the first domain V11 and having a duration corresponding to the first frequency CLK11.

In this respect, a triggering event, for example generated by a combinatory logic between two signals, for example an AND between an access validity signal AccVld generated by the control logic circuit FSM and the falling edge of the transfer state signal offset by one cycle PRDY_fe_d, is inputted by a D flip-flop. Since the D flip-flop is clocked by the first clock signal CLK11, the output of the D flip-flop provides a pulse having a duration of one cycle of the first clock signal CLK11 and triggered by the transfer state signal offset by one cycle PRDY_fe_d. The pulse-stretching circuit STRCHR can typically include a series of flip-flops and logic conditions on intermediate signals in the series to extend the duration of the pulse over several cycles of the first clock signal CLK11. The number of flip-flops in the series and of cycles of the first clock signal is chosen in such a way as to be adapted to the crossing time of the circuit for offsetting voltage levels LS.

In other words, the first domain V11 is configured to communicate the control signal W_pls to the synchronization circuit FFSYNC, at least one cycle of the first clock signal CLK11 after the providing of said data PWDAT, PADD.

This allows to guarantee that the data preserved accDAT, accADD by the starting register RDEP, possibly corrupted by a reinitialization PADRST occurring during the first cycle of the transfer, is not inputted by the destination register RDEST, given that the reinitialization PADRST prevents the generation of the transfer state signal offset by one cycle PRDY_fe_d and thus prevents the triggering of the transmission of the control signal W_pls.

Moreover, the synchronization circuit FFSYNC, to transmit the control signal W_pls_sync, advantageously includes a series of flip-flops, for example of the D flip-flop type, sufficient in number to guarantee a risk of propagation of a metastability lower than a specification of average duration between failures of the system on a chip SOC (usually designated by the Mean Time Between Failure (MTBF)).

Consequently, if a reinitialization PADRST occurs after the first cycle of the transfer and after the generation of the triggering command PRDY_fe_d, a possible metastability is not transmitted in the control signal W_pls through the synchronization circuit FFSYNC, given its configuration in this respect and given that the synchronization circuit FFSYNC is not affected by the first reinitialization signal PADRST.

The interface circuit INTF thus described therefore allows to not communicate to the destination register RDEST data corrupted by a reinitialization PADRST occurring during the first cycle of the transfer via the third measure 300, nor data corrupted by a reinitialization PADRST occurring in later cycles during the transfer via the second measure 200, nor to corrupt data currently being inputted by the destination register RDEST via the first measure 100.

The same effects are respectively obtained on the control signal W_pls_sync, via the third measure 300 and via the first measure acting on the generation of the control signal W_pls and the transmission of the control signal W_pls_sync by the synchronization circuit FFSYNC.

Moreover, other signals exchanged between the first domain V11 and the second domain V22, in particular link establishment signals CDC11, CDC22, contributing, for example, to the transfer of the data, can benefit from said first measure 100, second measure 200, and/or third measure 300.

For example, a signal CDC22 can be generated in the second domain V22 to communicate a state ready for the transfer of the destination register RDEST. The signal CDC22 can be the object of a "link establishment" procedure, usually designated by the term "handshake", and go in this respect into a signal adaptation element ADPT1 of the first domain V11, then be retransmitted CDC11 to the second domain V22. In the second domain V22, the link establishment signal CDC11 coming from the handshake procedure can for example allow the activation of an activation terminal E of the destination register RDEST, for example in combination with other signals via a logic circuit cond that conditions the activation.

In this example, the signal adaptation element ADPT1 can comprise a series of D flip-flops clocked by the first clock signal CLK11, so as to provide the link establishment signal CDC11 contributing to the input of the destination register RDEST, in a manner synchronous with the other signals accDAT, accADD, W_pls_sync coming from the first domain and controlling the input of the destination register RDEST.

Such a signal adaptation element ADPT1 is advantageously configured to not be reinitialized by the first reinitialization signal PADRST, and thus benefit from the effects of the first measure 100. Moreover, the signal adaptation element ADPT1 can be reinitialized by the second reinitialization signal POR.

FIG. 2 illustrates another example of a signal adaptation element ADPT2, belonging to the first domain V11, configured to transfer, between the first domain V11 and the second domain V22, an activation signal Enbl22 contributing to said transfer of the data. The activation signal Enbl22 is, for example, provided to the logic circuit conditioning the activation of the logic circuit cond.

This other example of a signal adaptation element ADPT2 includes a circuit configured for a handshake method, as described above in relation to FIG. 1, providing a synchronized link establishment signal CDC11 in the first domain V11 on the basis of a link establishment signal CDC22 coming from the second domain CDC22. The signal CDC11 is transmitted on an input of a logic gate PL, for example an OR gate, conditioning the transmission of the signal Enbl22 to the second domain V22 with a link establishment conditioning signal flg11, coming from the first domain V11.

Additionally, the signal adaptation element ADPT2 advantageously includes a second starting register RDEP2 configured to input the value, that is to say the logic state, of the link establishment conditioning signal flg11, in a single cycle of said first clock signal CLK11, that is to say according to the second measure 200 described above in relation to FIG. 1.

This second starting register RDEP2 is further configured to not be reinitialized by the first reinitialization signal PADRST, that is to say according to the first measure 100 described above in relation to FIG. 1.

This allows here again to limit the risk of engaging said signal contributing to said transfer in a state corrupted by a reinitialization occurring during the transfer, after the cycle used for the input of the digital signal.

Moreover, the invention is not limited to the implementations and embodiments described in relation to FIGS. 1 and 2, but encompasses all the alternatives thereof; for example, the invention encompasses a system on a chip provided with a signal adaptation element ADPT1, ADPT2, as described in relation to FIGS. 1 and 2, but considered in an isolated manner, that is to say without the starting registers RDEP1, RDEP2 and the synchronization circuit FFSYNC; or a system on a chip provided with a second starting register RDEP2 configured to transfer a conditional signal flg11 as described in relation to FIG. 2, but configured in an isolated manner, that is to say without the signal adaptation circuit ADPT2, in combination or not with the circuit described in relation to FIG. 1; or a system on a chip provided with a signal adaptation element ADPT2 as described in relation to FIG. 2, but considered in an isolated manner, that is to say without the starting register RDEP1, nor the synchronization circuit FFSYNC described in relation to FIG. 1.

The invention claimed is:

1. A system on a chip, comprising:
a first digital domain configured to be reinitialized by a first reinitialization signal;
a second digital domain; and
an interface circuit including at least one transfer element in the first digital domain;

wherein the interface circuit is configured to transfer data from said at least one transfer element to the second digital domain; and wherein said at least one transfer element is configured to not be reinitialized by the first reinitialization signal;

wherein the interface circuit includes a signal adaptation element, out of said at least one transfer element, configured to transfer, between the first digital domain and the second digital domain, a link establishment conditioning signal; and wherein said at least one signal adaptation element includes a starting register configured to input the value of the link establishment conditioning signal in a single cycle of a first clock signal and then preserve said value.

2. The system on a chip according to claim 1, wherein the second digital domain is configured to be reinitialized by a second reinitialization signal, and wherein said at least one transfer element is configured to be reinitialized by the second reinitialization signal.

3. The system on a chip according to claim 2, wherein the first digital domain is configured to be clocked by the first clock signal at a first frequency and the second digital domain is configured to be clocked by a second clock signal at a second frequency lower than the first frequency.

4. The system on a chip according to claim 3, wherein the first digital domain is configured to receive the first reinitialization signal from outside the system on a chip in a manner asynchronous with the first clock signal, and the second digital domain is configured to generate the second reinitialization signal during a synchronous process of power-on reset of the system on a chip.

5. The system on a chip according to claim 1, wherein the interface circuit includes:
a starting register out of said at least one transfer element;
a destination register in the second digital domain; and
a synchronization circuit in the first digital domain;
wherein the interface circuit is configured to transfer data from the starting register to the destination register upon command of a control signal transmitted by the synchronization circuit; and
wherein the synchronization circuit is configured to not be reinitialized by the first reinitialization signal.

6. The system on a chip according to claim 5, further comprising a control logic circuit configured to generate a transfer state signal during a first cycle of the first clock signal of the transfer of the data from the first digital domain to the second digital domain, wherein the starting register is configured to input said data or said link establishment conditioning signal upon command of the transfer state signal, so that said single cycle of the first clock signal is this first cycle.

7. The system on a chip according to claim 6, wherein the control logic circuit is configured to provide the transfer state signal offset by at least one cycle of the first clock signal to the synchronization circuit and adapted to trigger the transmission of said control signal.

8. A system on a chip, comprising:
a first digital domain configured to be reinitialized by a first reinitialization signal;
a second digital domain; and
an interface circuit including at least one transfer element in the first digital domain;
wherein the interface circuit is configured to transfer data from said at least one transfer element to the second digital domain; and wherein said at least one transfer element is configured to not be reinitialized by the first reinitialization signal;
wherein the interface circuit includes:
a starting register out of said at least one transfer element;
a destination register in the second digital domain; and
a synchronization circuit in the first digital domain;
wherein the interface circuit is configured to transfer data from the starting register to the destination register upon command of a control signal transmitted by the synchronization circuit; and
wherein the synchronization circuit is configured to not be reinitialized by the first reinitialization signal;
wherein the first digital domain is configured to be clocked by a first clock signal at a first frequency and the second digital domain is configured to be clocked by a second clock signal at a second frequency lower than the first frequency; and
wherein the first digital domain is configured to communicate the data to be transferred on an input of the starting register and to communicate the control signal to the synchronization circuit at least one cycle of the first clock signal after said data; and
wherein the starting register is configured to input the data to be transferred in a single cycle of the first clock signal and then preserve said data independently of said input.

9. The system on a chip according to claim 8, further comprising a control logic circuit configured to generate a transfer state signal during a first cycle of the first clock signal of the transfer of the data from the first digital domain to the second digital domain, wherein the starting register is configured to input said data upon command of the transfer state signal, so that said single cycle of the first clock signal is this first cycle.

10. The system on a chip according to claim 9, wherein the control logic circuit is configured to provide the transfer state signal offset by at least one cycle of the first clock signal to the synchronization circuit and adapted to trigger the transmission of said control signal.

11. The system on a chip according to claim 1, further comprising a control logic circuit configured to generate a transfer state signal during a first cycle of the first clock signal of the transfer of the data from the first digital domain to the second digital domain, wherein the starting register is configured to input said data or said link establishment conditioning signal upon command of the transfer state signal, so that said single cycle of the first clock signal is this first cycle.

12. The system on a chip according to claim 11, wherein the control logic circuit is configured to provide the transfer state signal offset by at least one cycle of the first clock signal to the synchronization circuit and adapted to trigger the transmission of said control signal.

13. A method for transferring data between at least a first digital domain and a second digital domain of a system on a chip, comprising:
transferring data from at least one transfer element in the first digital domain to the second digital domain; and
in response to a first reinitialization signal, causing a reinitialization of the first digital domain, but not causing a reinitialization of said at least one transfer element;
wherein transferring data comprises adapting a signal with a signal adaptation element out of said at least one transfer element, and transferring a link establishment conditioning signal between the first digital domain and the second digital domain; and wherein adapting the signal comprises inputting, in a starting register, a value of the link establishment conditioning signal in a single cycle of a first clock signal and preserving said value afterward.

14. The method according to claim 13, further comprising in response to a second reinitialization signal, reinitializing the second digital domain and said at least one transfer element.

15. The method according to claim 14, further comprising clocking the first digital domain by the first clock signal at a first frequency and clocking the second digital domain by a second clock signal at a second frequency lower than the first frequency.

16. The method according to claim 15, further comprising:
generating the first reinitialization signal from outside the system on a chip in a manner asynchronous with the first clock signal of the first digital domain; and
generating the second reinitialization signal during a synchronous process of power-on reset of the system on a chip.

17. The method according to claim 13, wherein transferring data comprises transferring data from a starting register out of said at least one transfer element to a destination register in the second digital domain in response to a control signal transmitted by a synchronization circuit of the first digital domain, wherein the first reinitialization signal does not cause a reinitialization of the synchronization circuit.

18. The method according to claim 17, further comprising:
generating a transfer state signal during a first cycle of the first clock signal of the transfer of the data from the first digital domain to the second digital domain; and
controlling input in the starting register in response to the transfer state signal so that said single cycle of the first clock signal is said first cycle.

19. The method according to claim 18, wherein the transfer state signal is provided offset by at least one cycle of the first clock signal to the synchronization circuit and triggering the transmission of said control signal.

20. A method for transferring data between at least a first digital domain and a second digital domain of a system on a chip comprising:
clocking the first digital domain by a first clock signal at a first frequency;
clocking the second digital domain by a second clock signal at a second frequency lower than the first frequency;
transferring data from at least one transfer element in the first digital domain to the second digital domain; and
in response to a first reinitialization signal, causing a reinitialization of the first digital domain, but not causing a reinitialization of said at least one transfer element;
wherein transferring data comprises transferring data from a starting register out of said at least one transfer element to a destination register in the second digital domain in response to a control signal transmitted by a synchronization circuit of the first digital domain, wherein the first reinitialization signal does not cause a reinitialization of the synchronization circuit;
communicating the data to be transferred on an input of the starting register;
communicating the control signal to the synchronization circuit at least one cycle of the first clock signal after said data; and
wherein transferring the data comprises inputting, by the starting register, the data to be transferred in a single cycle of the first clock signal and preserving said data afterward, independently of said input.

21. The method according to claim 20, further comprising:
generating a transfer state signal during the first cycle of the first clock signal of the transfer of the data from the first digital domain to the second digital domain; and
controlling input in the starting register in response to the transfer state signal so that said single cycle of the first clock signal is this first cycle.

22. The method according to claim 21, wherein the transfer state signal is provided offset by at least one cycle of the first clock signal to the synchronization circuit and triggering the transmission of said control signal.

23. The method according to claim 13, further comprising:
generating a transfer state signal during the first cycle of the first clock signal of the transfer of the data from the first digital domain to the second digital domain; and
controlling input in the starting register in response to the transfer state signal so that said single cycle of the first clock signal is this first cycle.

24. The method according to claim 23, wherein the transfer state signal is provided offset by at least one cycle of the first clock signal to the synchronization circuit and triggering the transmission of said control signal.

* * * * *